United States Patent [19]

Mayr et al.

[11] Patent Number: 4,660,926
[45] Date of Patent: Apr. 28, 1987

[54] OPTICAL CABLE

[75] Inventors: Ernst Mayr, Starnberg; Ulrich Oestreich, Munich, both of Fed. Rep. of Germany

[73] Assignee: Siemens Aktiengesellschaft, Berlin and Munich, Fed. Rep. of Germany

[21] Appl. No.: 657,241

[22] Filed: Oct. 3, 1984

[30] Foreign Application Priority Data

Oct. 18, 1983 [DE] Fed. Rep. of Germany ....... 3337863

[51] Int. Cl.[4] .................................. G02B 6/44
[52] U.S. Cl. ................................... 350/96.23
[58] Field of Search ......................... 350/96.23

[56] References Cited

U.S. PATENT DOCUMENTS

| 4,072,400 | 2/1978 | Claypoole et al. | 350/96.23 |
|---|---|---|---|
| 4,231,635 | 11/1980 | Zeidler et al. | 350/96.23 |
| 4,241,979 | 12/1980 | Gagen et al. | 350/96.23 |
| 4,272,155 | 6/1981 | Slaughter | 350/96.23 |
| 4,302,073 | 11/1981 | Bendayan et al. | 350/96.23 |
| 4,330,173 | 5/1982 | Oestreich | 350/96.23 |
| 4,389,087 | 6/1983 | Bendayan et al. | 350/96.23 |
| 4,448,484 | 5/1984 | Lombardi et al. | 350/96.23 |
| 4,552,433 | 11/1985 | Titchmarsh et al. | 350/96.23 |
| 4,555,054 | 11/1985 | Winter et al. | 350/96.23 |
| 4,557,558 | 12/1985 | Bresser | 350/96.23 |

FOREIGN PATENT DOCUMENTS

| 2532209 | 2/1977 | Fed. Rep. of Germany | 350/96.23 |
|---|---|---|---|
| 2913054 | 10/1980 | Fed. Rep. of Germany | 350/96.23 |
| 3144182 | 5/1983 | Fed. Rep. of Germany | 350/96.23 |
| 2063502 | 6/1981 | United Kingdom | 350/96.23 |

OTHER PUBLICATIONS

"Fibers in the Forefront"; *Optical Spectra*, Jul. 1976, p. 30.

*Primary Examiner*—William L. Sikes
*Assistant Examiner*—Robert E. Wise
*Attorney, Agent, or Firm*—Hill, Van Santen, Steadman & Simpson

[57] ABSTRACT

In an optical cable having a core which includes a high transverse pressure-resistant tube containing the optical waveguides and is concentrically surrounded by a support member characterized by the tube having an inner and outer layer with the inner layer consisting of aromatic polyamide and the outer layer consisting of polyester. Preferably, the outer support member includes aromatic polyamide fibers which are not saturated with resin.

15 Claims, 1 Drawing Figure

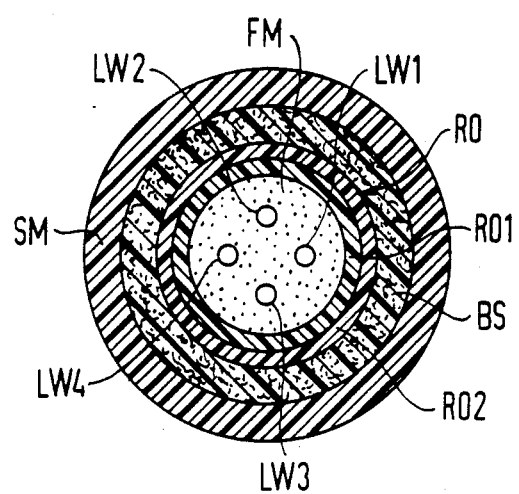

OPTICAL CABLE

BACKGROUND OF THE INVENTION

The present invention is directed to a concentrically constructed, self-supporting optical, aerial or submarine cable provided with an outer tensile reinforcement sheath and having a centrally disposed light waveguide core comprising a transverse pressure-resistant tube containing the optical waveguide members.

A cable, which has a high transverse pressure-resistant tube containing waveguide members as a core with a concentrically disposed outer tensile member, is disclosed in German OS No. 30 41 679. The tube employed therein is constructed of a metal and high tensile strength wires are applied to the tube in a concentric arrangement.

SUMMARY OF THE INVENTION

The present invention is directed to an optical cable which is constructed as a full dielectric arrangement without the employment of metallic parts and wherein it is also assured that the tensile clamping at the anchoring locations is possible without inadmissible stressing of the central elements. It is also noted that the object is to provide a tube which does not have its flexibility disrupted due to a matrix of hardened polyester or epoxy resins.

The object is obtained by an improvement in an optical cable having a central core including a tube containing optical waveguides and a concentric outer supporting member, said tube being of a high transverse pressure-resistant tube. The improvement comprises the tube being a double wall tube with an inner layer and an outer layer, said inner layer being constructed of an aromatic polyamide and the outer wall being constructed of a polyester.

The tubular central element has its inner layer consisting of an extruded aramide which is an aromatic polyamide and disadvantageous properties of the aramide can be avoided by means of the polyester sheath or layer which is extruded thereon as an outer layer. It should be noted that the disadvantageous properties of the aramide consist in that its length increases particularly due to the absorption of moisture. Due to its structure formed by an inner layer of the aramide and the outer layer by the polyester, the central tube thus represents a longitudinally and transversely stable structure which protects the light waveguides disposed in the interior thereof in an adequate fashion. Due to the additionally applied covering of aramide yarn as a supporting member, this tube is not inadmissibly deformed even under high pressures due, for example, to the anchoring helix even at a temperature of 70° C. or due to high water pressures. On the other hand, the finished cable can easily be flexed up to a radius of curvature which is below 200 mm and can therefore be easily wound and mounted on reels.

The mechanical firm structure is assured in the inventive cable by means of the fully dielectric structure. For example, there is no danger that an inadmissible longitudinal stress will build up given such an optical cable or, respectively, that jeopardization due to lightning striking or the like will occur.

It is provided according to the advantageous and further development of the invention that the tensile reinforcement of the supporting member consists of aramide fibers that have not been saturated with a resin. A particularly flexible cable structure is a result of this construction.

Given an advantageous further development of the invention, the aramide fibers of the reinforcement member are biased or prestressed. In view of a firm seating of the anchoring helix, it is also advantageous to apply the aramide fibers highly compressed and this can be particularly achieved by means of winding with a corresponding tensile synthetic film or foil. Separated by the film or foil, the aramide fibers lie in respectively successive higher compression plies.

An outer protective cladding of the inventive cable is advantageously formed of a polypropylene. This has the advantage that it is less fluid in comparison, for example, to polyethylene which property is particularly significant at elevated temperatures. It also shrinks less than the polyethylene and has slighter elastic deformations as a result of the higher value of the modulus of elasticity. The central tube which contains the optical light waveguide, which may be fibers, is filled with a partially cross-linked compound. The optical fibers in the tube are disposed preferably in spirals that have an excess length of up to 1%. Thus, each of the optical waveguides can move relative to each other during flexing or bending of the cable.

BRIEF DESCRIPTION OF THE DRAWING

The FIGURE is a cross-sectional view of the cable in accordance with the present invention.

DESCRIPTION OF THE PREFERRED EMBODIMENTS

The principles of the present invention are particularly useful when incorporated in a self-bearing or self-supporting light waveguide cable as illustrated in the FIGURE. The light waveguide cable is illustrated as having four light waveguides LW1–LW4, which may be optical fibers and are disposed in a soft filling compound FM, which preferably consist of a weakly cross-linked material. The waveguides and material are surrounded by a central, firm tube RO.

The tube RO exhibits the highest possible hardness and tenacity on the one hand and must be elastic enough that the cable can still be easily wound on reels and mounted. Bending radii of the order of magnitude below 200 mm are thereby advantageous. The tube RO consists of an inner layer RO1 which is constructed of an extruded aramide which is an aromatic polyamide. A thinner polyester sheath RO2 is applied to the sheath RO1 preferably by means of extrusion so that the two layers RO1 and RO2 jointly produce the central tube RO. Whereas the aramide alone can increase in length particularly due to absorption of moisture and is not resistant to ultraviolet radiation, the polyester layer applied as the outer layer RO2 inhibits the access of moisture to the inner layer to prevent changes in its shape. In addition, the outer layer of polyester material protects the aramide from sunlight. The employment of the aramide for the inside layer has the advantage that this material is extremely hard and tenacious given sufficient elastic stretching in temperature up to 100° C. and no tendency to permanently deform or flow. In addition, the aramide inner layer is insensitive and unaffected by the filling compounds. A certain adhesive tendency also exists between the aramide and the polyester which prevents a peeling of the layers when the hollow tube RO is being bent.

A covering or layer BS is subsequently spun on the tube as multiple plies under high compression and under given conditions forms a tensile and bearing element or supporting member in the region of the cable cladding. Initial stretching is suppressed by means of a suitable prestressing. To this end, the individual aramide or aromatic polyamide fibers are subjected to a corresponding prestretching on the order of 0.1 to 0.2%. The compression of the covering can be advantageously stabilized by means of one or more windings with corresponding films, or foils, preferably polyester films which are not shown, being inserted between the layers or plies.

A protective outer cladding SM of polypropylene is applied onto the covering BS under pressure. The employment of this material has the advantage that the deformability under transverse pressure is lower up to 70° C. than in the case of low density polyethylene (LDPE) and even high density polyethylene (HDPE).

The construction of the cable in accordance with the above manner provides a central tube RO which is not deformed in its mounted condition even under high pressures due, for example, to an anchoring helix which is externally applied to the protective cladding SM, even at temperatures up to 70° C. On the other hand, the finished cable can still be easily bent even up to a radius of curvature which is below 200 mm because the internally disposed tube RO has a relatively small diameter and uses materials, the aramide and polyester, which are sufficiently elastic. Further, the rope-like cable characteristics are retained due to the elimination of the saturated resins, this being expressed, for example, in the inner damping and attenuation of vibrations.

The end preparation of the cable can also be carried out in the simplest manner imaginable because of the emitted resin saturation of the covering BS which serves as the reinforcement or tensile element.

The following wall thicknesses under normal execution are expediently provided for the individual parts of the self-bearing or self-supporting light waveguide cable:

| Normal Execution | Diameter |
| --- | --- |
| Inside diameter of the aramide resin layer (RO1) | 3.0 mm |
| Outside diameter of the inner layer (RO1) | 5.0 mm |
| Outside diameter of the outer polyester layer (RO2) | 6.0 mm |
| Outside diameter of the reinforcing member consisting of two plies of aramide yarn, for example, "Kevlar 49" (BS) | 9.2 mm |
| Outside diameter of foil covering for the ply | 9.4 mm |
| Outside diameter of the outer cladding (SM) | 11.8 mm |

This format can be varied within wide ranges. However, the ratio of the inside diameter to the outside diameter of the pressure-resistant tube should be roughly preserved.

An advantageous format consists wherein the ratio of the wall thickness of the inner tube RO1 to the wall thickness of the outer tube RO2 is, selected in a range between 1:1 and 3:1. The outside diameter of the inner tube RO1 should be selected in a range between 1.2 to 5 mm and the outside diameter of the outer tube should be selected in a range between 2 to 9 mm.

Although various minor modifications may be suggested by those versed in the art, it should be understood that we wish to embody within the scope of the patent granted hereon, all such modifications as reasonably and properly come within the scope of our contribution to the art.

We claim:

1. In an optical cable having a central core including a tube containing optical waveguides and a concentric outer supporting member, said tube being a high transverse pressure-resistant tube, the improvements comprising said tube having a double wall with an inner layer and an outer layer, said inner layer being constructed of an extruded aromatic polyamide and the outer layer being constructed of an extruded polyester, said tube being filled with a soft filling compound and said optical waveguides being disposed in said filling compound.

2. In an optical cable according to claim 1, wherein the concentric outer supporting member consists of aromatic polyamide fibers which are not saturated with resin.

3. In an optical cable according to claim 2, wherein the aromatic polyamide fibers are disposed in a highly compressed state and are covered by a film.

4. In an optical cable according to claim 2, wherein said aromatic polyamide fibers are prestretched.

5. In an optical cable according to claim 4, wherein the aromatic polyamide fibers are held in a compressed state by an outer film wrapped thereon.

6. In an optical cable according to claim 1, wherein the filling compound is a partially cross-linked compound.

7. In an optical cable according to claim 6, wherein the waveguides are disposed in the tube in a spiral arrangement with an excess length of up to 1%.

8. In an optical cable according to claim 1, wherein the outer supporting member includes an outer cladding consisting of polypropylene.

9. In an optical cable according to claim 1, wherein the ratio of the wall thickness of the inner layer to the wall thickness of the outer layer of the tube is selected to lie in a range of between 1:1 and 3:1.

10. In an optical cable according to claim 1, wherein the outside diameter of the inner layer of the tube is selected to be in a range of 1.2 to 5 mm and the outside diameter of the outer layer of the tube is selected to be in a range between 2 to 9 mm.

11. In an optical cable according to claim 1, wherein the light waveguides are disposed in a spiral and have an excess length of up to 1%.

12. In an optical cable according to claim 1, wherein the outer support member includes at least one layer of aromatic polyamide fibers wrapped on the tube and free of resin and an outer covering consisting of polypropylene.

13. In an optical cable according to claim 12, wherein the aromatic polyamide fibers are prestretched.

14. In an optical cable having a central core including a tube containing optical waveguides and a concentric outer supporting member, said tube being a high transverse pressure-resistant tube, the improvements comprising said tube having a double wall with an inner layer and an outer layer, said inner layer being constructed of an aromatic polyamide and the outer layer being constructed of a polyester, a ratio of the wall thickness of the inner layer to the wall thickness of the outer layer of the tube being selected to lie in a range of between 1:1 and 3:1.

15. In an optical cable having a central core including a tube containing optical waveguides and a concentric outer supporting member, said tube being a high transverse pressure-resistant tube, the improvements comprising said tube having a double wall with an inner layer and an outer layer, said inner layer being constructed of an aromatic polyamide and the outer layer being constructed of a polyester, the inner layer having an outside diameter being selected to lie in a range of between 1.2 to 5 mm and the outer layer having an outside diameter being selected to lie in a range of between 2 and 9 mm.

* * * * *